May 15, 1956 A. J. SLINGERLAND 2,745,419
APPARATUS FOR SHRINKING PACKAGES AROUND FOOD PRODUCTS
Filed Dec. 10, 1954 2 Sheets-Sheet 1

Inventor:
Arthur J. Slingerland
By Gary, Desmond & Parker
Attys.

May 15, 1956  A. J. SLINGERLAND  2,745,419
APPARATUS FOR SHRINKING PACKAGES AROUND FOOD PRODUCTS
Filed Dec. 10, 1954  2 Sheets-Sheet 2
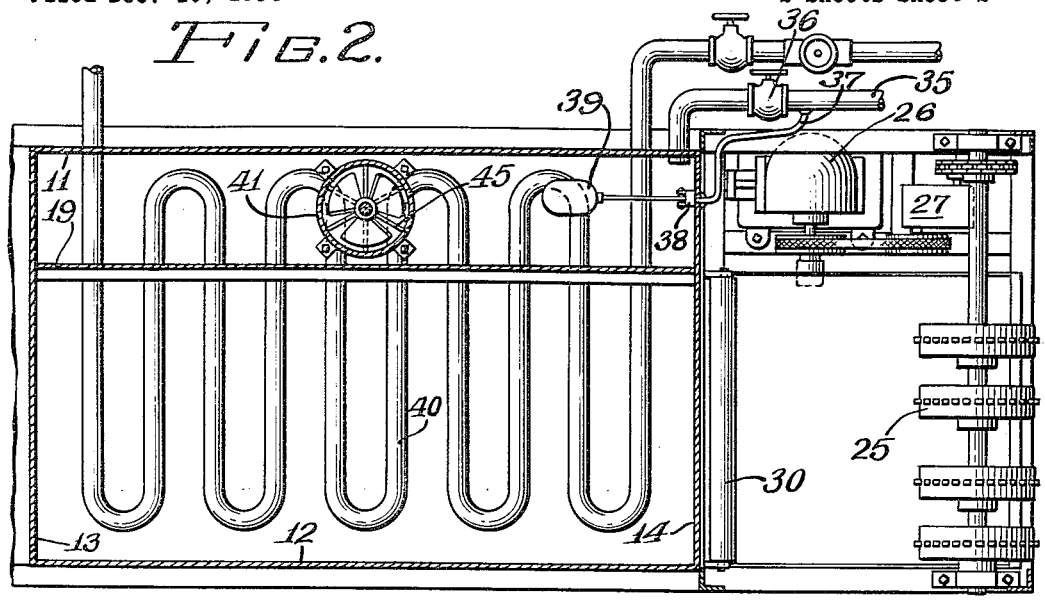
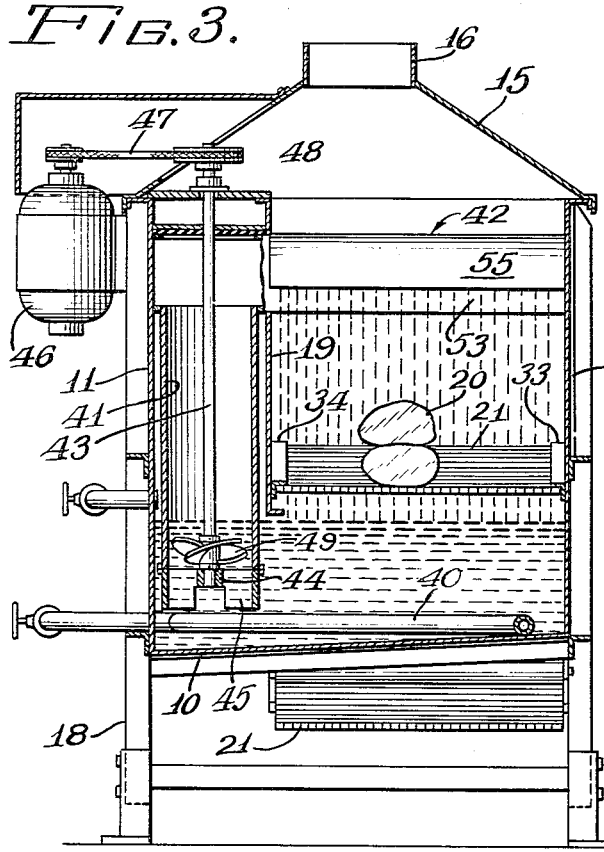
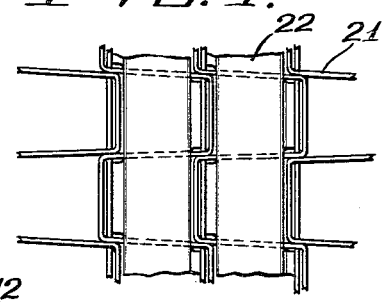
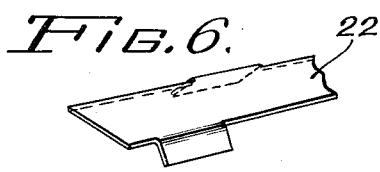
Inventor:
Arthur J. Slingerland
By Gary, Desmond & Parker
Attys.

United States Patent Office 2,745,419
Patented May 15, 1956

2,745,419

APPARATUS FOR SHRINKING PACKAGES AROUND FOOD PRODUCTS

Arthur J. Slingerland, Chicago, Ill., assignor to Edward S. Schneider, Chicago, Ill.

Application December 10, 1954, Serial No. 474,559

1 Claim. (Cl. 134—130)

This invention relates to novel apparatus for treatment of poultry, fish, or other meat cuts and food products which are packaged in moisture and vapor resistant, transparent or substantially transparent, sealed, thin flexible bags or envelopes of shrinkable plastic film material, such as shrinkable polyvinylidene chloride known as Saran or Cry-o-vac, shrinkable polyethylene, or like film materials normally possessed of or provided with the property of shrinkability when subjected to heat, and which are generally of a heat softenable or thermoplastic character.

It is known to encase food products of the foregoing character in shrinkable bags as described, followed by evacuation or expelling of air prior to sealing, if desired, and to then bring the so packaged product into contact with heated water, by dipping or in a continuous manner by conveyor apparatus, to cause the bag to shrink and to substantially conform to the contours of the contained food, after which it may be chilled for storage or shipment.

It is an object of the present invention to provide a novel and improved apparatus, of the conveyor or continuous type, whereby the shrinkable casings on the packaged food are brought into contact with heated liquid in a novel manner so that the shrinking operation may be effected in a more rapid and efficient manner with better conformity of the bag to the contours of the encased food product.

The objects of the invention are accomplished by a novel means and manner of bringing the encased food product into contact with heated liquid such as water, or a mixture of water and another liquid such as ethylene glycol when higher temperatures are required, for shrinking a particular plastic, without undesirable boiling of the liquid. For example, when the plastic casing is composed of Cry-o-vac, water alone at a temperature of about 195° F. can be employed, and when the casing is composed of shrinkable polyethylene a mixture of water and ethylene glycol which can be heated to about 240° F. without boiling is employed.

Thus, in accordance with the present invention, the encased food product is passed on a conveyor through a chamber where it is met with a substantially vertically descending cascade or thick concentrated solid wall of liquid heated to a temperature required for shrinking the particular plastic casing, extending transversely of and completely across the conveyor, under a drop or head of approximately one and one-half to two feet. This not only insures effective contact with articles positioned on any portion of the conveyor width, but further insures rapid and efficient heat transfer to the shrinkable bag as distinguished from less efficient or less effective sprays, inclined sheets or other turbulent streams of hot liquid. The concentrated vertical wall of hot liquid further aids in obtaining desirable close conformity of the plastic bag to the contours of the encased food product by reason of the head under which it is dropped and the manner in which it is dropped giving a maximum velocity for the predetermined drop, to thus exert a molding pressure or force on the plastic material in its heat softened condition, to thereby bring about a joint shrinking and pressure molding effect.

Other objects and advantages relate to details of construction and arrangement of parts, as will be apparent from a consideration of the following specification and drawings, wherein:

Fig. 2 is a diagrammatic section on the line 2—2 of Fig. 1.

Fig. 3 is a diagrammatic transverse section on the line 3—3 of Fig. 1.

Figs. 4, 5 and 6 are detail views of the conveyor employed in the apparatus.

Figure 1:
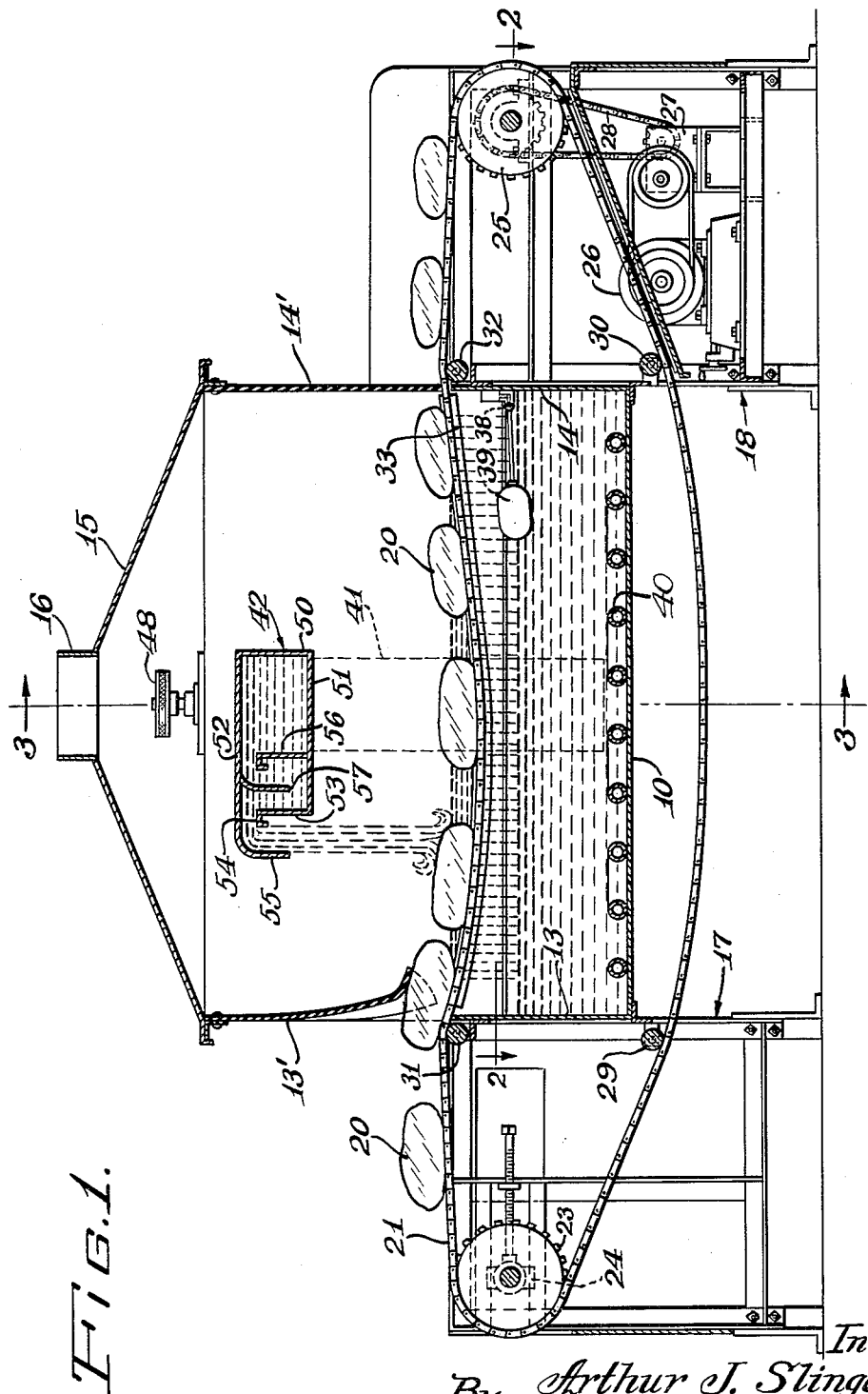
Fig. 1 is a diagrammatic longitudinal sectional elevation of the apparatus of the present invention.

Referring to the drawings, the apparatus comprises a housing defined by a bottom 10, side walls 11 and 12, end walls 13 and 14, and an inclined top 15 leading to the exhaust 16, the whole being endwise secured to and supported by the framework standards generally designated 17 and 18. The interior of the housing is further provided with a longitudinally extending wall 19 defining therein a longitudinal chamber between the walls 12 and 19. Portions of the two end walls 13 and 14 are replaced at the ends of this chamber by means of the flexible curtains 13' and 14', secured at their upper edges to components of the end walls 13 and 14 respectively, so as to permit entrance and exit of encased food products 20 carried on the conveyor 21.

The conveyor 21 is of a width substantially that of the chamber between walls 12 and 19, and in the form of an endless foraminated belt suitably composed of flexible, open-mesh, flat wire as shown in the detail of Fig. 4, having secured to the face thereof a plurality of spaced, transversely extending metal slats 22. The belt is foraminated and the slats spaced so as to permit the treating liquid which is delivered to the packages on the conveyor to pass through to the reservoir below the upper run of the belt. The provision of the flat slats 22 on the open mesh belt prevents the bags encasing the food products from becoming ruptured and further aids in maintaining a pool of liquid on a depressed portion of the belt passing through the chamber, as will be described. The conveyor belt 21 is carried at one end by the sprocket wheels 23 carried by the horizontally adjustable bearing block 24 mounted on the standard 17, and at the opposed end by the sprocket wheels 25 on the standard 18. The belt 21 is suitably driven through the motor 26, speed reducer 27 and belt 28 leading to sprocket wheel 25. Intermediate the sprocket wheels the belt 21 is guided in its lower or return run around the rollers 29 and 30, and in its upper run around the rollers 31 and 32. In its passage through the treating chamber the belt 21 is further guided in a concave path or dip by means of the arcuate angle guides 33 and 34 which, aided by the spaced slats 22 on the belt, permit temporary arrestment of liquid delivered thereover and formation of a pool of limited depth to make certain that all portions of the shrinkable bags are contacted by the hot treating liquid, the degree of dip of the belt being limited, however, so as to prevent collection of a pool of liquid of depth which might cause flotation of the packaged products thereon.

The base of the housing provides a reservoir for liquid employed in the apparatus and is supplied by conduit 35, initially by opening valve 36, and subsequently in operation through line 37 and valve 38 controlled by float 39, after closing valve 36, to replace water lost in the operation. The liquid in the reservoir is heated by means of the steam coil 40 disposed within and adjacent the base of the housing. It will be understood, that in connection therewith, suitable thermostatic control means may be employed for maintaining the water or other heat-carrying liquid at desired substantially constant temperature in the reservoir.

Disposed between the housing walls 11 and 19 is a pump comprising the cylindrical tube 41, the lower end of which is open and projects below the level of the liquid maintained in the reservoir regulated by float 39. The upper end of tube 41 is closed and is provided with a lateral opening communicating with one end of what is termed herein the sluice box and generally designated as 42. A rotatable shaft 43 extends axially of tube 41, and its lower end is received in the bearing 44 supported by the spider 45. The shaft 43 is driven by the motor 46, belt 47 and pulley 48, whereby to rotate the propeller 49 and to continuously pump and recirculate liquid from the reservoir at the base of the housing into the sluice box 42.

The sluice box 42 is disposed adjacent the top of the housing substantially medially of the end walls 13 and 14 and parallel thereto between and endwise closed by walls 12 and 19, and communicates through the latter with pump tube 41. The sluice box is further defined by the rear side wall 50, bottom 51, top 52 and front wall 53, the latter terminating in the forwardly and downwardly projecting lip 54 short of and spaced from the top 52, to provide a spillway for liquid contained in the sluice box when filled by the pump. The top 52 extends beyond the wall 53 and terminates in an arcuate and then downward vertically extending deflector lip 55. Intermediate the sluice box 42 there are further provided the baffles 56 and 57 extending parallel to the walls 50 and 53 and fully between the opposed closed ends.

As the heated liquid from the reservoir is lifted through tube 41, it is admitted to one end of the sluice box through a communicating opening in an area between the rear wall 50 and baffle 56. The baffles 56 and 57 serve to distribute the water throughout the length of the sluice box and to reduce turbulence thereof before overflowing between the lips 53 and 55, and as a result, when the pump is operated to substantially keep the sluice box filled, a concentrated, vertically descending wall of liquid, of from about one to two inches thick, and of considerable mass, is dropped from the sluice box at a maximum velocity for the drop onto the packaged product intercepting the wall of liquid while moved on the conveyor 21. In this manner maximum efficiency of the heated liquid and the drop thereof is obtained to effect a rapid heat transfer for shrinking the bag and molding it to the contours of the encased product.

Although I have described the preferred embodiment of my invention, it will be understood that various changes may be made in details without departing from the spirit thereof.

I claim:

In a device of the class described, a foraminous substantially horizontally extending endless conveyor belt including transversely extending spaced slats defining the conveying surface thereof, an enclosure comprising side walls embracing an intermediate length of the upper run of said belt, means on said side walls guiding the upper run of said belt in a concave path in its passage therebetween, a hot liquid collector and reservoir disposed below the upper run of said belt, an overflow receptacle disposed between said side walls and above the upper belt run for continuously delivering thereto a substantially-solid vertically-descending wall of liquid, said receptacle comprising a top, bottom, side and end walls, one of said side walls terminating in spaced relation to said top wall and forming an overflow opening therewith, spaced lip means extending from said top and spaced side wall forming a downwardly opening and vertically projecting spout extending substantially the full width of said belt, a liquid inlet opening formed in one end of said receptacle adjacent the other side wall thereof, baffle means in said receptacle disposed between its side walls for reducing turbulence of and for distributing liquid introduced therein, and motor driven propeller pump means for continuously elevating heated liquid from said reservoir and introducing it to the inlet opening of said receptacle.

References Cited in the file of this patent

UNITED STATES PATENTS

| | | |
|---|---|---|
| 1,207,720 | Dilg | Dec. 12, 1916 |
| 1,234,131 | Cleveland | July 24, 1917 |
| 1,529,770 | Cavanaugh | Mar. 17, 1925 |
| 1,760,979 | Ferry | June 3, 1930 |
| 2,048,447 | Hewitt | July 21, 1936 |
| 2,194,565 | Moss | Mar. 26, 1940 |
| 2,298,779 | Vogt | Oct. 13, 1942 |
| 2,363,491 | Bagnall | Nov. 28, 1944 |
| 2,633,437 | Detjen | Mar. 31, 1953 |